United States Patent [19]

Masuda

[11] 4,238,766
[45] Dec. 9, 1980

[54] CHANNEL LEVEL ADJUSTING APPARATUS

[75] Inventor: Hajime Masuda, Tokyo, Japan

[73] Assignee: Hochiki Corporation, Tokyo, Japan

[21] Appl. No.: 17,166

[22] Filed: Mar. 2, 1979

[30] Foreign Application Priority Data

Mar. 6, 1978 [JP] Japan .............................. 53-27479[U]

[51] Int. Cl.³ .............................................. H04N 7/16
[52] U.S. Cl. ....................................... 358/86; 328/173;
330/126; 333/132; 455/6; 455/232; 455/304;
455/306
[58] Field of Search ................... 325/397, 308; 358/86,
358/38; 179/1 B, 1 VL, 1 D, 15 FD, 15 FE;
333/132, 129, 126, 81 R; 328/163, 173;
330/126, 149, 151; 455/303–306, 3, 6, 232;
370/73

[56] References Cited

U.S. PATENT DOCUMENTS

| 2,711,516 | 6/1955 | Fredendall | 333/132 |
| 2,737,628 | 3/1956 | Haines | 330/126 |
| 3,755,754 | 8/1973 | Putz | 330/149 |
| 3,818,362 | 6/1974 | Van Sluys | 330/149 |

FOREIGN PATENT DOCUMENTS

2307671 9/1974 Fed. Rep. of Germany ........... 333/132

*Primary Examiner*—Marc E. Bookbinder
*Attorney, Agent, or Firm*—Cooper, Dunham, Clark, Griffin & Moran

[57] ABSTRACT

A channel level adjusting apparatus for equalizing the amplitude level of the received television signals of a plurality of channels. The channel level adjusting apparatus is designed so that when the input amplitude level of the television signals of a relatively small number or at least one channel is different from the more nearly equal or uniform input amplitude level of the television signals of the remaining relatively large number of channels, only the television signal or signals of the higher amplitude level are taken out, attenuated to a desired level and then combined, with a 180-degree phase difference, with the television signals of all the channels, thus making the television signal or signals of the higher input amplitude level more nearly equal in amplitude level to the television signal or signals of the lower input amplitude level and thereby generating the television signals of all the channels having relatively uniform amplitude levels.

5 Claims, 9 Drawing Figures

CHANNEL LEVEL ADJUSTING APPARATUS

BACKGROUND OF THE INVENTION

The present invention relates to a channel level adjusting apparatus well suited for use with the head end of a community television receiving equipment.

Generally, the field intensity of the broadcast waves arriving at the community receiving antenna of a community receiving equipment differ for different channels. As a result, the television signals of different channels received by the antenna are each subjected to level adjustment so that the amplitude levels of the television signals of all the channels are adjusted to a fixed value and the signals are then fed to the individual subscriber terminals. In this case, there is less chance of a situation arising in which the input amplitude level becomes unequal for all the different channels, and a situation frequently occurs in which the input amplitude level of a particular smaller number of channels is much higher than that of the other channels, as for example, the input amplitude level for a plurality of channels of wide coverage stations is uniform and the input amplitude level of only one or two local stations differ greatly from that of the former.

With a known channel level adjusting apparatus of this type in which the unequal input amplitude levels of the television signals on the respective channels are adjusted to generate the television signals of the equal amplitude level for all the channels, it has been a usual practice so that the television signals of all the channels received by the antenna are separated for the respective channels by the bandpass filters which are each provided for one of the channels, are subjected to level adjustment for each channel or particular channels, are again subjected to level adjustment with respect to the television signals of all the channels and are then generated. This type of channel level adjusting apparatus employing a bandpass filter for each channel is disadvantageous in that where the number of channels is large, the same number of bandpass filters are required and moreover it is much wasteful in that the television signals are separated for all the channels by the bandpass filters despite the fact that as mentioned previously a situation occurs practically at all times in which the number of channels differring in input amplitude level and requiring level adjustment is small.

Another type of channel level adjustment apparatus having bandpass filters which are not the same but smaller in number than the channels is known in the art, which comprises a bandpass filter for passing only the television signal of that channel which is to be subjected to level adjustment and one or two broad-band bandpass filters for passing the television signals of the remaining channels. This type of apparatus is also disadvantageous in that the filter characteristic of the broadband bandpass filter is not sharp thus tending to cause interference with the signals of the other bandpass filters and that if a notch filter of a sharp cutoff characteristic is connected to the broad-band bandpass filter to attenuate the undesired frequency components and thereby to prevent the interference, the sharp cutoff characteristic tends to cause the cutoff frequency to change with a change in temperature and thereby to make it impossible to ensure stable performance.

SUMMARY OF THE INVENTION

It is a principal object of the present invention to provide a channel level adjusting apparatus which is so designed that where the television signals received from the minority of channels are lower in input amplitude level than those of the other channels, the television signals having the uniform input amplitude level for all the channels can be generated with a reduced number of filters than previously.

It is another object of the invention to provide a channel level adjusting apparatus in which the number of filter means is the same with the number of channels whose television signals differ in input amplitude and require level adjustment and there is no need to provide as many filter means as there are the channels, thus ensuring a simplification in the construction.

In accordance with the present invention there is thus provided a channel level adjusting apparatus whereby when the television signals of a plurality of channels are applied to the input terminal, a group of the television signals of the channels whose input amplitude levels differ negligibly from one another and the television signal of the remaining at least one particular channel whose input amplitude level is not negligibly different from the former, are subjected to level adjustment and generated as television signals of the uniform amplitude level. The apparatus comprises a first circuit path including filter means for passing only one or the other of the said group of the television signals and the said television signal of the particular channel applied to the input terminal and higher in input amplitude level, a second circuit path for passing the television signals of all the channels from the input terminal, phase shifting means for producing a phase difference of 180 degrees between the television signal or signals of the higher input amplitude level which are passed through the first and second circuit paths, mixer means for combining the television signal or signals from the first circuit path with that from the second circuit path and delivering the resulting signals as television signals of all the channels to an output terminal, and attenuator means provided in the first circuit path so that the television signals generated from the mixer means have the uniform amplitude level.

The phase shifting means and the attenuator means are provided so that the television signal or signals from the first circuit path are changed to an opposite phase component having an amplitude corresponding to the difference in amplitude level between one of the group of the television signals and the television signal of the particular channel on all the channels passed through the second circuit path, i.e., one having the higher input amplitude and the other having the lower input amplitude. Thus, of the television signals of all the channels from the second circuit path, the television signal or signals having the higher input amplitude level are superposed on the oppositely phased component so that the television signals are attenuated by an amount corresponding to the amplitude level of the oppositely phased component and consequently the television signals of all the channels are made more nearly equal in amplitude level.

Since that which is required is to ensure that the television signal or signals having the higher input amplitude level have a phase difference of 180 degrees when they are delivered to the output terminals of the first and second circuit paths, the required phase shifting means can be most easily provided by inserting a phase inverter circuit in one or the other of the first and second circuit paths.

The principal aim of the invention consists in minimizing the number of filters used as the filter means, and consequently where the television signal of at least one of a plurality of channels differs considerably in input amplitude level from those of the other channels, either a bandpass filter or band elimination filter is used for the filter means depending on whether the amplitude level of the particular channel is higher or lower than that of the other channels.

In other words, where the television signals of a plurality of channels applied to the input terminal include the television signals of a group in the channels whose input amplitude levels differ negligibly from one another with respect to the characteristic of the transmission system leading to the subscriber's terminals and the television signal of at least one particular channel not belonging to the former, if the input amplitude of the television signal of the particular channel is higher than that of the former, a bandpass filter is provided in the first circuit path to pass only the television signal of the particular channel. On the contrary, if the input amplitude level of the television signal on the particular channel is lower than that of the television signals of the group in the channels, a band elimination filter is provided in the first circuit path to reject only the television signal of the particular channel. In any case, only either one of the group in the channels and the particular channel, that is, the television signal or signals having the higher input amplitude level are selectively passed through the first circuit path by the filter means.

The bandpass filter or the band elimination filter should preferably be of the type whose frequency-amplitude characteristic is flat and frequency-phase characteristic is linear within its pass band.

The above and other objects, construction and effects of the invention will be readily understood by reading the following detailed description taken in conjunction with the accompanying drawings.

DESCRIPTION OF THE PREFERRED EMBODIMENTS

Figure 1:
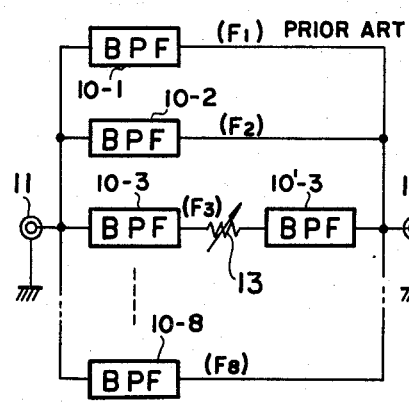
FIG. 1 is a circuit diagram showing a prior art channel level adjusting apparatus.
Figure 2:
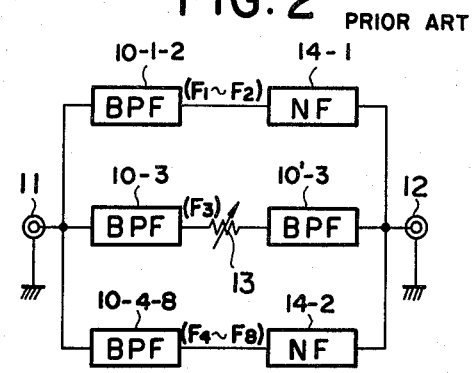
FIG. 2 is a circuit diagram showing another prior art channel level adjusting apparatus.
Figure 3:
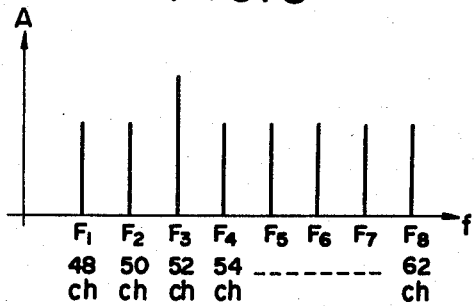
FIG. 3 is a graph showing an example of the difference in input amplitude level for the respective channels, with the abscissa representing the frequencies f with the associated channel numbers and the ordinates representing the input amplitude levels A of the respective television signals.

The circuits shown in FIGS. 1 and 2 illustrate prior art channel level adjusting apparatus. In FIG. 1 numerals 10-1, 10-2, 10-3, . . ., 10-8 designate bandpass filters whereby the television signals of all the channels (e.g., 8 channels) applied to an input terminal 11 are separated for the respective channels. For example, as shown in FIG. 3, the bandpass filter 10-1 passes only a television signal $F_1$ of channel 48, the bandpass filter 10-2 only a television signal $F_2$ of channel 50, the bandpass filter 10-3 only a television signal $F_3$ of channel 52, . . ., and the bandpass filter 10-8 only a television signal $F_8$ of channel 62. When the television signal $F_3$ of the channel 52 is high in input amplitude level as compared with the other channels as shown in FIG. 3, an attenuator 13 connected in series with the bandpass filter 10-3 attenuates the signal $F_3$ to the same level as the signals of the other channels and the signal $F_3$ is fed, along with the television signals of the other channels, to an output terminal 12 through another bandpass filter 10-3' having the similar pass band as the bandpass filter 10-3. A disadvantage of this type of channel level adjusting apparatus is that a bandpass filter must be provided for each channel with the resulting increase in the cost. Another prior art apparatus designed to reduce the number of bandpass filters is shown in FIG. 2, and the apparatus comprises a bandpass filter 10-3 for passing the television signal $F_3$ of the channel 52 which is to be attenuated and broad-band bandpass filters 10-1-2 and 10-4-8 for passing the television signals of the other channels. While the broad-band bandpass filters 10-1-2 and 10-4-8 may be respectively replaced with a low-pass filter and high-pass filter, due to filter design limitations, it is impossible to obtain such low-pass filter, high-pass filter or broad-band bandpass filter having a sharp cutoff characteristic and consequently interference will be caused between the television signals in the bands around the cutoff frequency, e.g., between the frequencies $F_2$, $F_3$ and $F_4$ in the case of FIG. 2. To prevent such interference, as shown in FIG. 2, the broad-band bandpass filters 10-1-2 and 10-4-8 may each be followed by a notch filter having a sharp cutoff characteristic to reject the undesired frequency components. Since the cutoff characteristic of such notch filter is sharp, there is a disadvantage that the filter tends to be affected by temperature changes and the notching frequency tends to vary with temperature, thus making it impossible to ensure stable performance of the channel level adjusting apparatus against temperature variation.

Figure 4:
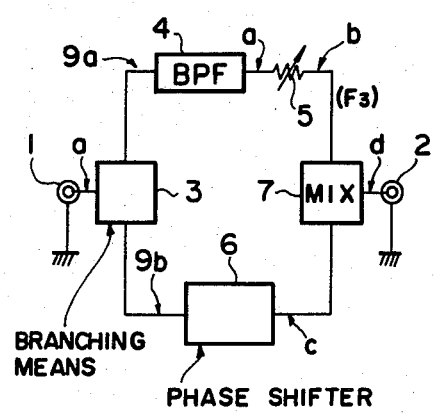
FIG. 4 is a circuit diagram showing an embodiment of a channel level adjusting apparatus according to the invention, which is used in the case shown in FIG. 3.

FIG. 3 shows the input amplitude levels of the television signals on a plurality of channels (e.g., 8 channels) received by a community receiving antenna and shown for the respective channels, and it is assumed that the channel 52 is assigned to a local station which generates a television signal of a high received field intensity and the other channels are assigned to wide coverage stations which generate television signals of a relatively low and uniform received field intensity. FIG. 4 shows the circuit construction of a channel level adjusting apparatus according to an embodiment of the invention, and the apparatus is designed so that only the television signal F₃ of the channel 52 is attenuated to the same level as the television signals of the other channels and then the signals are delivered. In the figure numeral 1 designates an input terminal, 2 an output terminal, and 3 distributing means such as a branching circuit comprising a plurality of resistors or a distributing amplifier whereby the television signals of all the channels are branched into a first circuit path 9a and a second circuit path 9b. Provided in the first circuit path 9a is a series combination of a bandpass filter 4 and an attenuator 5. The bandpass filter 4 passes only the television signal $F_3$ of the particular channel or channel 52 and its frequency-amplitude characteristic and frequency-phase characteristic are respectively flat and linear in its pass band. The attenuator 5 is adjustable and it attenuates the television signal $F_3$ passed through the bandpass filter 4 by a desired amount. The second circuit path 9b includes a phase shifter 6 whereby the television signals of all the channels passed through the second circuit path 9b are inverted in phase, and consequently the signal $F_3$ of the channel 52 passed through the second circuit path 9b has a 180-degree phase difference with the signal $F_3$ of the same channel passed through the first circuit path 9a.

The terminal ends of the first and second circuit paths 9a and 9b are connected to the output terminal 2 through a mixer 7, so that the television signals from the two circuit paths are combined with one another and then delivered to the output terminal 2.

Figure 5:
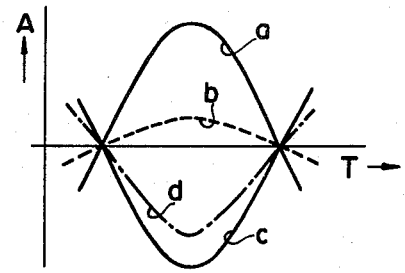
FIG. 5 is a signal waveform diagram useful for explaining the amplitude level attenuating operation with the circuit construction of FIG. 4, with the abscissa representing the period T and the ordinate representing the amplitude level A.

Assuming that a signal a in FIG. 5 corresponds to the television signal $F_3$ of the particular channel 52 at the input terminal 1, the signal $F_3$ at the output terminal of the bandpass filter 4 is the same as the signal a and the signal a is attenuated by the attenuator 5, thus producing a signal b. On the other hand, in the second circuit path 9b the signal a of the particular channel is inverted in phase as shown at c in FIG. 5 and the signal c is combined with the signal b by the mixer 7, thus generating at the output terminal 2 the television signal $F_3$ of the particular channel which was attenuated as shown at d in the figure. The television signals $F_1, F_2, F_4, \ldots, F_8$ of the remaining group in the channels other than the particular channels 52, i.e., channels 48, 50, 54, ..., 62 are delivered to the output terminal 2 through the mixer 7 without any attenuation but with a 180-degree phase difference with the signals at the input terminal 1. In this way, only the television signal $F_3$ of the channel 52 having the higher input amplitude level is attenuated and the television signals having more nearly equal amplitude level for all the channels are generated from the output terminal 2.

While, in the embodiment shown in FIG. 4, the phase shifter 6 is provided in the second circuit path 9b, the phase shifter 6 may be connected in series with the bandpass filter 4 in the first circuit path 9a. In this case, the television signal $F_3$ of the channel 52 passed through the first circuit path 9a is inverted in phase and it is then attenuated. On the other hand, of the television signals of all the channels passed through the second circuit 9b the positive phase television signal $F_3$ of the channel 52 is combined in the mixer 7 with the oppositely phased signal $F_3$ from the first circuit path 9a and cancelled by an amount corresponding to the difference in amplitude level between it and the television signals of the other channels. In this way, the television signals having the equal amplitude level for all the channels are generated from the output terminal 2.

While the foregoing description has been made in connection with the case where the number of particular channels having an input amplitude level difference is 1, where the number of channels each having a higher input amplitude level than the other channels is 2, it is only necessary to constitute the first circuit path with two series circuits each comprising a bandpass filter and an attenuator and connected in parallel with each other. In this case, if the level difference between the television signals of the two channels having the higher amplitude levels is negligible, it is only necessary to connect only two bandpass filters in parallel with each other.

Figure 6:
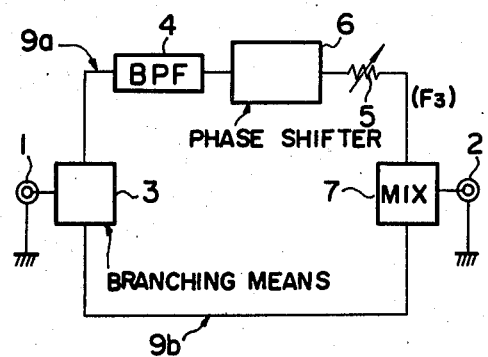
FIG. 6 is a circuit diagram showing another embodiment of the apparatus of the invention used in the case shown in FIG. 3.
Figure 7:
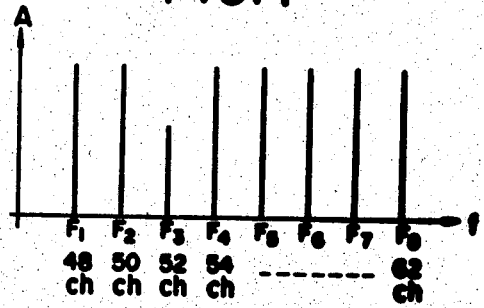
FIG. 7 is a graph showing another example of the difference in input amplitude level for the respective channels, with the abscissa representing the frequencies f with the associated channel numbers and the ordinate representing the input amplitude levels A of the television signals.
Figure 8:
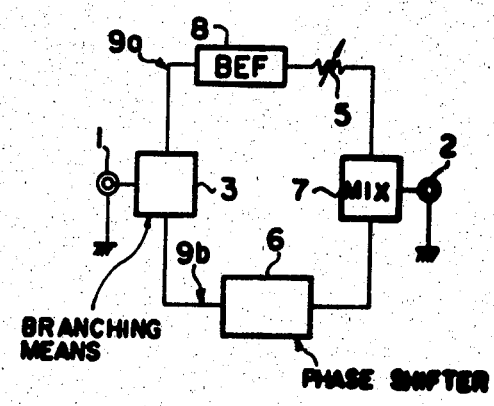
FIGS. 8 and 9 are circuit diagrams showing still another embodiments of the apparatus of the invention used in the case shown in FIG. 7.
Figure 9:
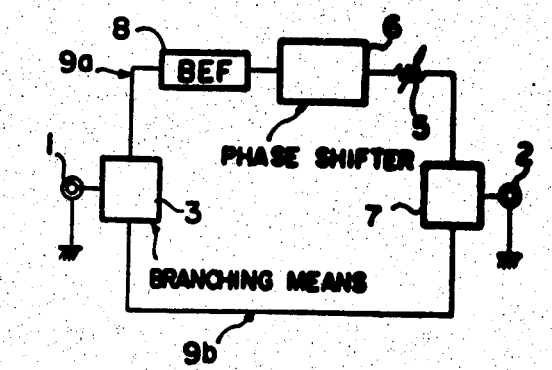

FIG. 7 shows the input amplitude levels for the respective channels, with the assumption that differing from the case of FIG. 3 the television signal of the particular channel 52 is lower in input amplitude level than the group of the other channels having the equal level. In this case, as shown in FIGS. 8 and 9, the filter provided in the first circuit path comprises a band elimination filter 8 instead of the bandpass filter. FIG. 8 corresponds to the embodiment of FIG. 4 and FIG. 9 corresponds to the embodiment of FIG. 6. In either of the embodiments shown in FIGS. 8 and 9, the band elimination filter 8 rejects only the television signal $F_3$ of the particular channel 52 and it passes the television signals of the group of the other channels having the higher equal amplitude level. In the embodiments shown in FIGS. 8 and 9, those television signals which are attenuated by cancellation with the oppositely phased components in the mixer 7 are the television signals $F_1, F_2, F_4, \ldots, F_8$ of the channel group, and the television signal $F_3$ of the particular channel is delivered without attenuation to the output terminal 2 from the second circuit path 9b through the mixer 7. Of course, with respect to the phase of the television signals at the input terminal 1, the oppositely phased television signals appear at the output terminal 2 in the embodiment of FIG. 8, and the television signals of the same phase appear at the output terminal 2 in the embodiment of FIG. 9.

Even with the embodiments of FIGS. 8 and 9, if the number of particular channels having lower amplitude levels is two or more and if the difference in level between these channels is negligibly small, it is only necessary to replace the band elimination filter 8 of FIG. 8 or 9 with series connected band elimination filters having the rejection characteristics corresponding to the respective channels.

With the channel level adjusting apparatus of the invention described so far, considering the loss due to the insertion of the filter and the phase shifter in the first and second circuit paths, there may be any instance where the level adjustment provided by inserting the attenuator only in the first circuit path is insufficient, and in such case another attenuator may be inserted in the second circuit path to effect the desired level adjustment by means of the attenuator.

We claim:

1. In a channel level adjusting apparatus having an input terminal and an output terminal wherein television signals of a plurality of channels are applied to said input terminal, a group of the television signals on a plurality of the channels being different in input amplitude level from one another by a negligibly small amount and the television signal of a remaining channel differing in input amplitude level from the television signals of the group by an amount not negligible, and wherein the amplitude levels of all the television signals are adjusted to be closer to each other for delivery to said output terminal, the improvement comprising a first circuit path from said input terminal to said output terminal including filter means for passing at least one of the television signals having the higher input level of (i) the television signals of said group of channels and (ii) the television signal of said remaining channel; attenuation means provided in said first circuit path; a second circuit path from said input terminal to said output terminal for passing the television signals of all said channels from said input terminal to said output terminal; phase shifting means in one of said circuit paths for phase shifting signals passing therethrough 180 degrees; and mixer means for combining the signals passed through said first and through said second circuit paths after said phase shifting and attenuation whereby the amplitude level of the television signals delivered to said output terminal are made more nearly equal to one another than are said signals applied to said input terminal.

2. An apparatus according to claim 1, wherein said phase shifting means is provided in said second circuit path.

3. An apparatus according to claim 1, wherein said phase shifting means is provided in said first circuit path.

4. An apparatus according to claim 1, wherein the input amplitude level of said signal of said remaining channel is higher than that of the television signals of said group of channels, and wherein said filter means is a bandpass filter for passing only the television signal of said remaining channel.

5. An apparatus according to claim 1, wherein the input amplitude level of the television signals of said group of channels is higher than that of the television signal of said remaining channel, and wherein said filter means is a band elimination filter for passing only the television signals of said group of channels.

* * * * *